United States Patent
Lecerf (10) Patent No.: US 7,337,070 B2
(45) Date of Patent: Feb. 26, 2008

(54) METHOD FOR TREATING SEISMIC CUBES CORRESPONDING TO OBTAINED FOR COMMON ZONE AT DIFFERENT TIMES

(75) Inventor: Didier Lecerf, Brentford (GB)

(73) Assignee: Compagnie Generale de Geophysique, Massy (FR)

( * ) Notice: Subject to any disclaimer, the term of this patent is extended or adjusted under 35 U.S.C. 154(b) by 23 days.

(21) Appl. No.: 10/554,849

(22) PCT Filed: Apr. 28, 2004

(86) PCT No.: PCT/FR2004/001026

§ 371 (c)(1),
(2), (4) Date: Oct. 28, 2005

(87) PCT Pub. No.: WO2004/097455

PCT Pub. Date: Nov. 11, 2004

(65) Prior Publication Data

US 2006/0235620 A1 Oct. 19, 2006

(30) Foreign Application Priority Data

Apr. 28, 2003 (FR) .................................. 03 05159

(51) Int. Cl.
*G01V 1/28* (2006.01)
(52) U.S. Cl. ...................................................... 702/17
(58) Field of Classification Search .................. 702/17, 702/16
See application file for complete search history.

(56) References Cited

U.S. PATENT DOCUMENTS 5,586,082 A * 12/1996 Anderson et al. ............. 367/73

6,131,071 A 10/2000 Partyka et al.

OTHER PUBLICATIONS

Coleou, T. et al, "Multivariate Geostatistical Filtering of Time-Lapse Seismic Data . . . ", SEG Int'l Exposition, Salt Lake City, UT, Oct. 6-11, 2002, XP002269218.

Lumley, D. et al, "Meren Field, Nigeria: A 4D Seismic Case Study", Offshore Technology Conference, Houston, TX, May 1-4, 2000, XP008027167.

Hughes, J.K., "Examination of Seismic Repeatability as a Key Element of Time . . . ", SPE Reservoir Eval. & Eng., vol. 3, No. 6, Dec. 2000, pp. 517-524.

Sandjivy, Luc, "Factorial Kriging Analysis of Geochemical Prospecting Data", Sciences et Techniques Miniers, Paris, France, Sep. 29, 1987, pp. 1-164.

Daly, Colin, "An Application of Geostatistics to Several Filtering Problems", Nationale Supericure des Mines de Paris, Paris, France, Jun. 28, 1991, pp. 1-235.

* cited by examiner

*Primary Examiner*—Donald E McElheny, Jr.
(74) *Attorney, Agent, or Firm*—David M. Ostfeld (57) ABSTRACT

Method of processing a collection of seismic cubes corresponding to one and the same acquisition zone and to various moments of acquisition, characterized in that at least one seismic cube which is an estimate of the component common to at least two seismic cubes corresponding to different moments of acquisition is determined and this estimate of common component is subtracted from at least one of the two initial cubes.

22 Claims, 6 Drawing Sheets

METHOD FOR TREATING SEISMIC CUBES CORRESPONDING TO OBTAINED FOR COMMON ZONE AT DIFFERENT TIMES

GENERAL FIELD AND STATE OF THE ART

The present invention pertains to the processing of seismic traces corresponding to acquisitions carried out for one and the same zone at different moments.

In the field of seismic surveying, it is common practice to reveal alterations in geological or geophysical characteristics of a given zone of the earth's crust, by comparing seismic cubes corresponding to acquisitions carried out at two different moments (4D or time-lapse seismic surveying).

The expression "seismic cube" is understood here and throughout the present text to mean any gather of seismic traces in which each seismic trace is a time-dependent amplitude signal and is associated with a given position on the ground zone over which the acquisition has been carried out.

Figure 1:
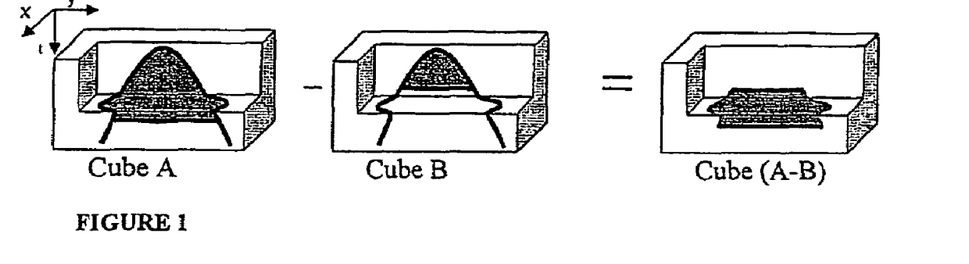
FIG. 1 is a diagrammatic representation which illustrates the revealing of the alterations in a hydrocarbon volume by subtraction of the seismic cubes recorded at various production steps; in the cubes, the horizontal zone separating the two cubes symbolizes the contact between the hydrocarbon (top part) and the water (bottom part)

Generally, as illustrated in FIG. 1, the revealing of variations is done by subtracting two cubes of seismic data corresponding to the two moments of acquisition.

It is this procedure in particular that is used to reveal alterations in hydrocarbon deposits during production.

However, when the difference in terms of seismic signal is of low amplitude, the physical properties that one seeks to reveal may easily be masked by artefacts such as for example noise due to the imperfect geometry of the seismic data acquisition.

Figure 2:
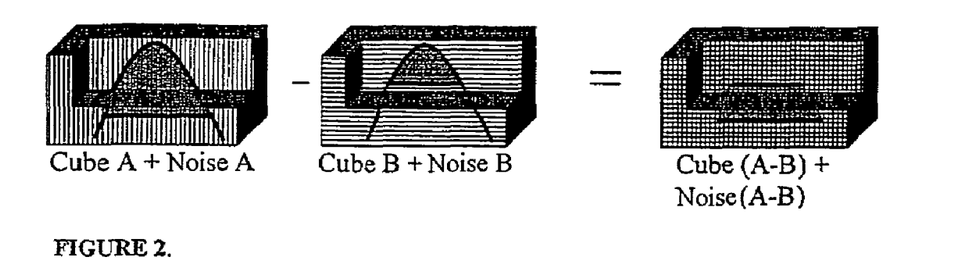
FIG. 2 is a diagrammatic representation which illustrates the fact that the subtraction of the noisy cubes merely increases the level of noise with respect to the variations that are revealed.

The random and non-repeatable nature of the noise of each acquisition implies that, as illustrated in FIG. 2, the straightforward subtraction of the seismic data increases the level of noise with respect to the signal sought. In this FIG. 2, the noise is represented diagrammatically by horizontal lines (cube A) and vertical lines (cube B) which are superimposed in the subtracted cube (cube A-B). Moreover the superposition of the respective noise destroys its statistical spatial organization (if it exists) and hence renders the filtering thereof more difficult.

PRESENTATION OF THE INVENTION

An aim of the invention is to propose a novel technique which makes it possible to alleviate the drawbacks of the prior art.

In contradistinction to straightforward subtraction, the invention proposes to take as reference cube not one of the existing cubes, that is to say the cube recorded initially over time for the 4D seismic survey, but the common part of the two (or more) cubes which by definition is invariant.

Thus, the invention proposes a method of processing a collection of seismic cubes, each seismic cube corresponding to a gather of seismic traces in which each seismic trace is a time-dependent amplitude signal and is associated with a given position on the ground zone over which the acquisition has been carried out, the various seismic cubes corresponding to one and the same acquisition zone and to various moments of acquisition, characterized in that at least one seismic cube which is an estimate of the component common to at least two seismic cubes corresponding to different moments of acquisition is determined and this estimate of common component is subtracted from at least one of the two initial cubes.

This yields differential cubes which have been determined without the noise of the two initial cubes being superimposed therein.

Also, these differential cubes may easily be filtered, since the statistical spatial organization has not been destroyed therein through the superposition of noise.

DESCRIPTION OF ONE OR MORE EXEMPLARY IMPLEMENTATIONS

GENERAL EXAMPLE

We consider two seismic cubes (data A and data B) corresponding to two acquisitions carried out, for one and the same ground zone, at two different moments.

The data may be decomposed thus:

data A=common part+noise A data B=common part+noise B+$\Delta$ where $\Delta$ represents the variations of the seismic data and where the common part is defined as the coherent or invariant part of the data A and B.

In a first step, an estimate of this common part is determined.

Various procedures may be used for this purpose.

In particular, this estimate may be calculated by co-kriging, or else by cross-correlation or by calculating mean values.

This estimated common part represents the geology which has not changed over time.

It has the advantage of exhibiting a better signal-to-noise ratio than the initial data.

Subsequently, the following two partial differences are determined:

Diff $A$=data $A$−estimated common part

Diff $B$=estimated common part−data $B$

Figure 3:
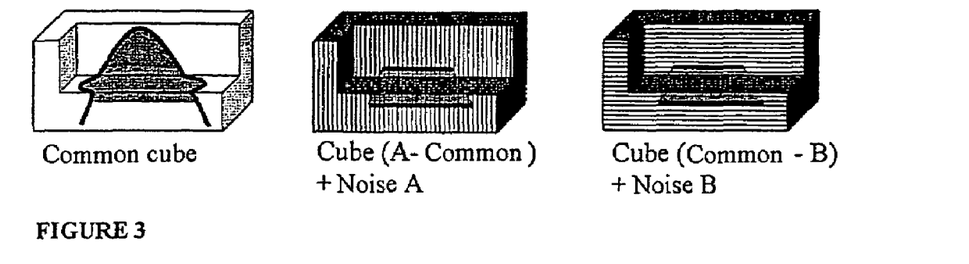
FIG. 3 is a diagrammatic representation which illustrates the determination of a common cube and the determination, from this common cube, of difference cubes.

FIG. 3 illustrates the cube of common component and the cubes of partial differences (differential cubes) thus obtained.

The two partial differences make it possible to reveal the alterations in the geology.

They satisfy:

Diff $A$=noise $A-\alpha.\Delta$

Diff $B$=−noise $B-(1-\alpha)\Delta$

Where $\alpha$ is the distribution ratio of the residual signal, which is often close to 0.5 but may vary spatially.

The Signal/Noise ratio of these two partial differences is therefore $\alpha.\Delta$/noise A for Diff A and $(1-\alpha)\Delta$/noise B for Diff B.

A deterministic filtering processing is then implemented on the partial differences thus obtained, this being possible by virtue of the fact that the statistical spatial organizations are preserved and in particular have not been removed through the superposition of noise and that the noise of each data set preserves its initial intrinsic properties, such as its statistical spatial coherence. The independent filtering for each partial difference may be implemented for example by a deterministic spatial filter in the KxKy domain or a statistical filter based on factorial kriging or even a function for smoothing along a particular axis making it possible to attenuate the acquisition noise. The spatial orientation of the noise is all the more easy to determine by statistical measurements (2D/3D variograms) when the common part containing the majority of the seismic signal of the geology has been subtracted. After filtering, it is possible to reconstitute the total difference from the two filtered partial differences thus obtained:

data $A$−data $B$=Diff $A$+Diff $B$

It is understood that the summation of the partial differences after filtering of the latter allows a better signal-to-noise ratio than that obtained by calculating the total difference by subtraction of the data A and of the data B.

It will be noted that there is no loss of information, since the sum of the partial differences is equal to the total difference.

Likewise it will be noted that, if the noise level is different between the initial data A and B, one of the two partial differences exhibits a better signal-to-noise ratio than the total difference.

In certain cases, the information about the alterations in the geology or geophysics of the subsoil will be more apparent on a cube corresponding to a partial difference than on the cube corresponding to the total difference.

EXAMPLE OF CALCULATING A COMMON PART PRINCIPLE

Figure 4:
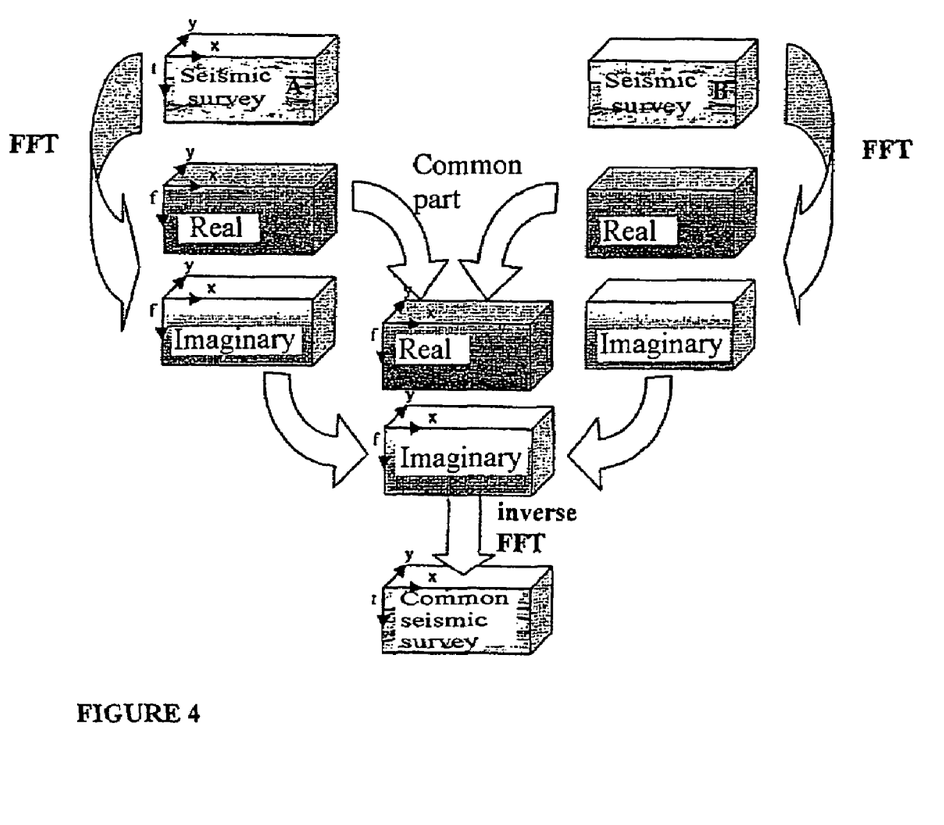
FIG. 4 illustrates a possible mode of implementation for the determination of an estimate of the part common to two seismic cubes.

FIG. 4 illustrates an exemplary calculation of the common part using spatial automatic factorial co-kriging (or automatic multi-variable kriging analysis) in the frequency domain.

The initial temporal data are transformed by FFT into cubes of real parts and of imaginary parts in the frequency domain (Fourier domain).

The common part of each real and imaginary frequency plane is calculated by the method of so-called "automatic factorial co-kriging" with a 2D operator in the (x, y) plane.

By the process of inverse Fourier transform of the common cube of the real parts and of the common cube of the imaginary parts, the temporal common cube of the seismic data is thus obtained.

DETAILED EXAMPLE

A more detailed example of processing is given below:

1) In a first step, the data which correspond to the two gathers of traces (cube A and cube B) to be processed are read. These data are recorded in a file where each trace is identified by a row number and a column number which correspond to a position on the ground.

2) In a second step, a time window is selected to define on the seismic traces the time interval taken into consideration for the processing. The portions of traces thus selected are supplemented as appropriate with zero values to obtain for each trace a number of samples corresponding to a power of 2, 3, 5, etc. so as to allow the FFT according to the FFT functions used.

3) In a third step, a fast Fourier transform (FFT) is applied to the succession of samples corresponding to each of the traces and to the time window selected.

A total of four frequency-wise cubes are thus obtained corresponding to the real part and the imaginary part of each selection of the cubes A and B.

4) For each frequency plane, two (2D) maps, the one corresponding to the data of cube A and the other to the data of cube B, are then constructed, in the real domain on the one hand and in the imaginary domain on the other hand.

An automatic factorial co-kriging processing is then applied to the maps thus obtained for the data cubes A and B so as to deduce therefrom a map common to the two initial maps.

Reminders of factorial co-kriging are given in Annex I at the end of the description.

The factorial co-kriging processing is of course carried out independently on the one hand with the real parts and on the other hand with the imaginary parts.

This processing comprises for example, in each of these two domains, the following steps:

as a function of a given variogram radius, calculation of a 2D variogram for the map corresponding to the data A and for the map corresponding to the data B; calculation of a cross-variogram.

construction of the covariance and cross-variance matrices from the 3 variograms thus obtained.

solving of the factorial co-kriging system which corresponds to these matrices, so as to deduce therefrom a spatial operator, that is to say one which is dependent on the row-wise and column-wise position of the sample considered on the mapping. To stabilize the inversion of the matrix of the system, a constant which corresponds to a very small percentage of the square root of the product of the two variances is added to the diagonal of the covariance matrices.

the spatial operator thus obtained is then convolved with the initial maps to obtain the common part of the two maps.

5) The processing just described is repeated for each frequency plane of the real and imaginary parts. Two cubes are obtained, one for the common real parts and the other for the common imaginary parts.

6) Once all the frequency planes have been calculated, an inverse Fourier transform of the common complex cubes is implemented so as to obtain a cube in terms of common seismic time.

EXEMPLARY RESULTS

Figure 5:
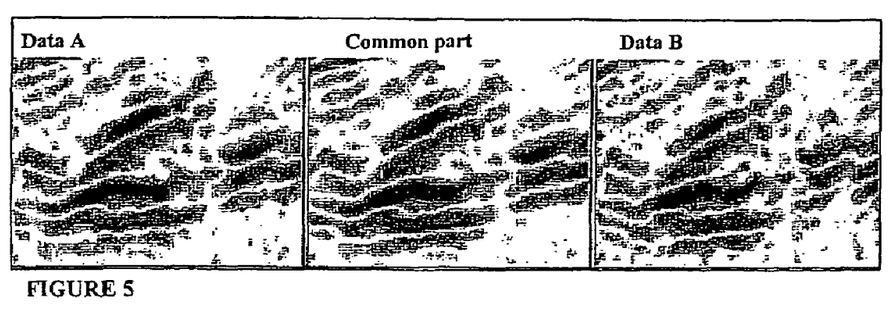
FIGS. 5 and 6 illustrate for a given instant of sampling over time, examples of common and differential cubes obtained by implementing the method illustrated in FIGS. 3 and 4.
Figure 6:
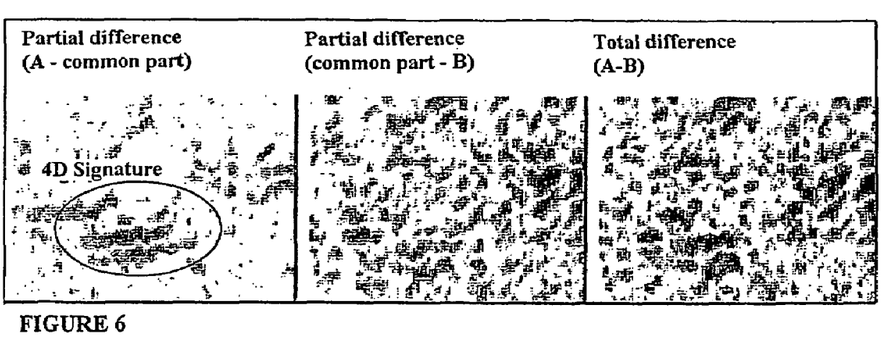

FIGS. 5 and 6 illustrate results obtained with this processing.

The data A and B were recorded at an interval of several years.

FIG. 5 shows that the common part appears with a better signal-to-noise ratio than the initial data A and B. It represents the time-invariant geology, the latter is taken as reference. The total difference of the two data sets A and B is decoupled into two partial differences with respect to their common part. It is observed that the variations in the seismic response of geological events over time (4D signature) are much more apparent in the partial difference of the data A than in the total difference (FIG. 6). This is due to the fact that the noise visible in the total difference is relative to the partial difference of the data B.

EXAMPLES OF VARIANT IMPLEMENTATIONS

Other variant embodiments are of course conceivable.

Processing Mask

Figure 7:
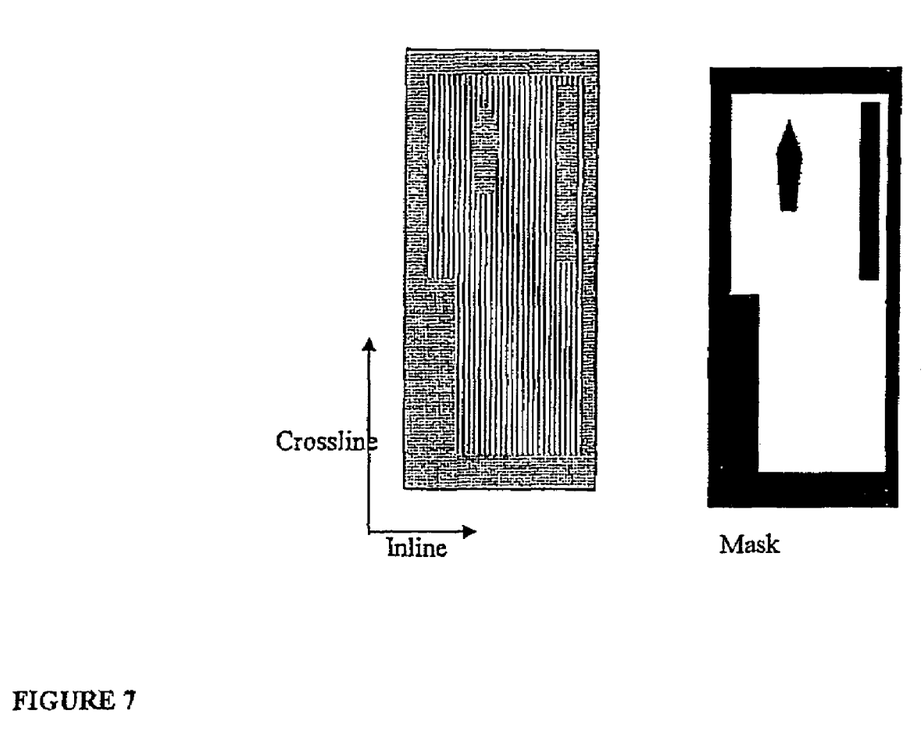
FIG. 7 illustrates an exemplary mask applied to the 2D mappings.

Thus, as illustrated in FIG. 7, the calculation of the operator may be limited to specific regions corresponding to valid data. The variograms and cross-variogram are thus calculated over the regions defined by the mask. The mask can for example hide a dataless zone due to a drilling platform or very noisy data on account of edge effects. The use of a mask will improve the quality of the operator and therefore of the noise filtering. The mask is defined with white (1) valid values and with black (0) nonvalid values.

Double Iteration

Figure 8:
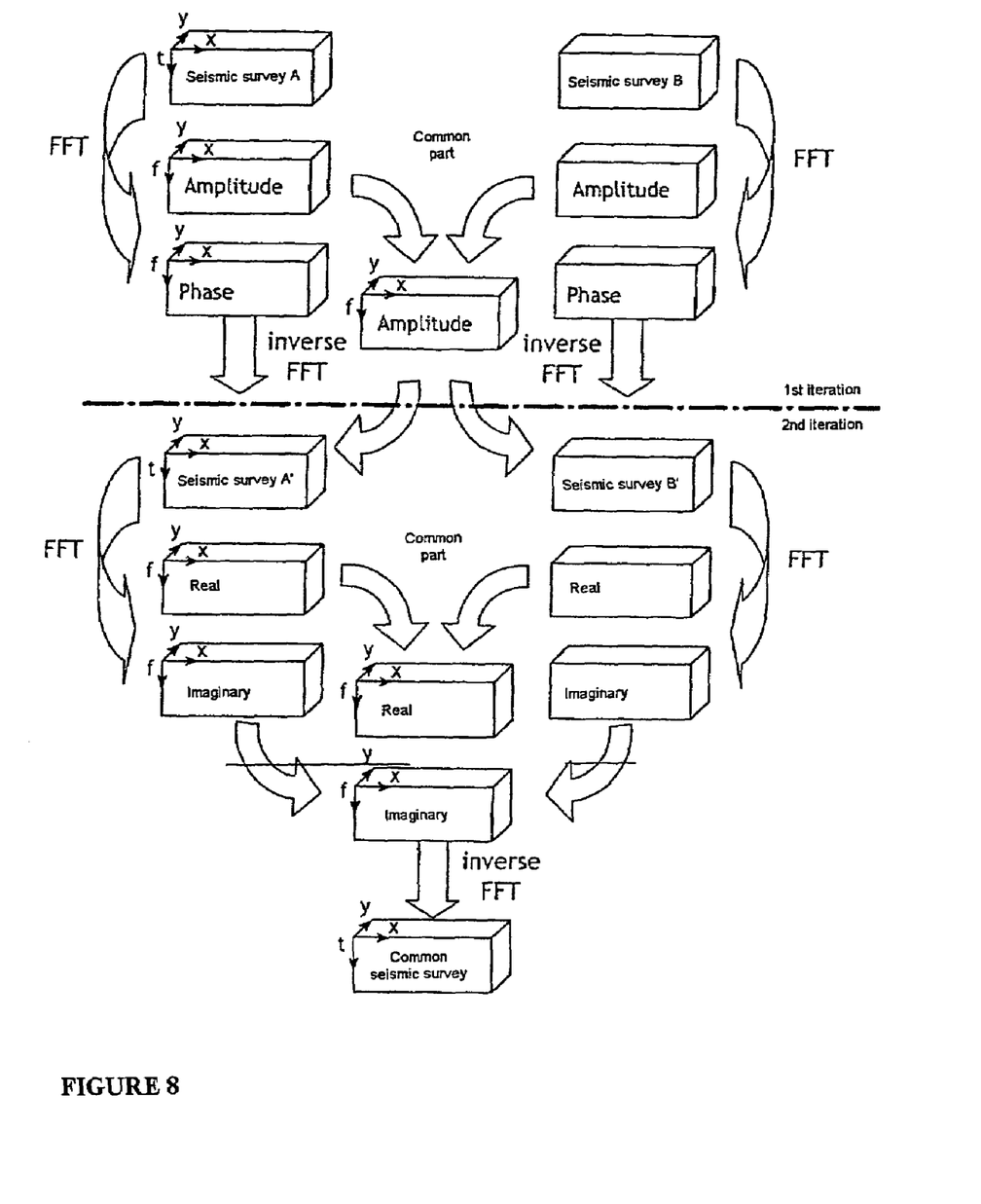
FIG. 8 illustrates another mode of possible implementation with several iterations.

It is sometimes advantageous to do the calculation of the common cube in two iterations: (FIG. 8).

The first iteration consists in calculating a common amplitude spectrum.

For this purpose, for each frequency plane, an amplitude mapping and a phase mapping are determined from the maps of real and imaginary parts. Next, from the amplitude mappings thus determined for the data A and the data B for each frequency, a common spectral amplitude mapping is determined. This mapping is in an appropriate manner determined by automatic factorial co-kriging.

The real and imaginary part of A and B is then reformulated with the common amplitude thus obtained and the initial phase of A and B. After inverse FFT processing of the cubes, two seismic cubes A' and B' having the same frequency content are obtained.

These two cubes are then processed with a second iteration.

The second iteration calculates the real and imaginary common part of A' and B'. In fact, it will fix the common phase of the two seismic cubes A' and B' since the amplitude spectrum is already common after the first iteration.

The common part is then determined in the same manner as previously described with reference to FIG. 6.

Figure 9:
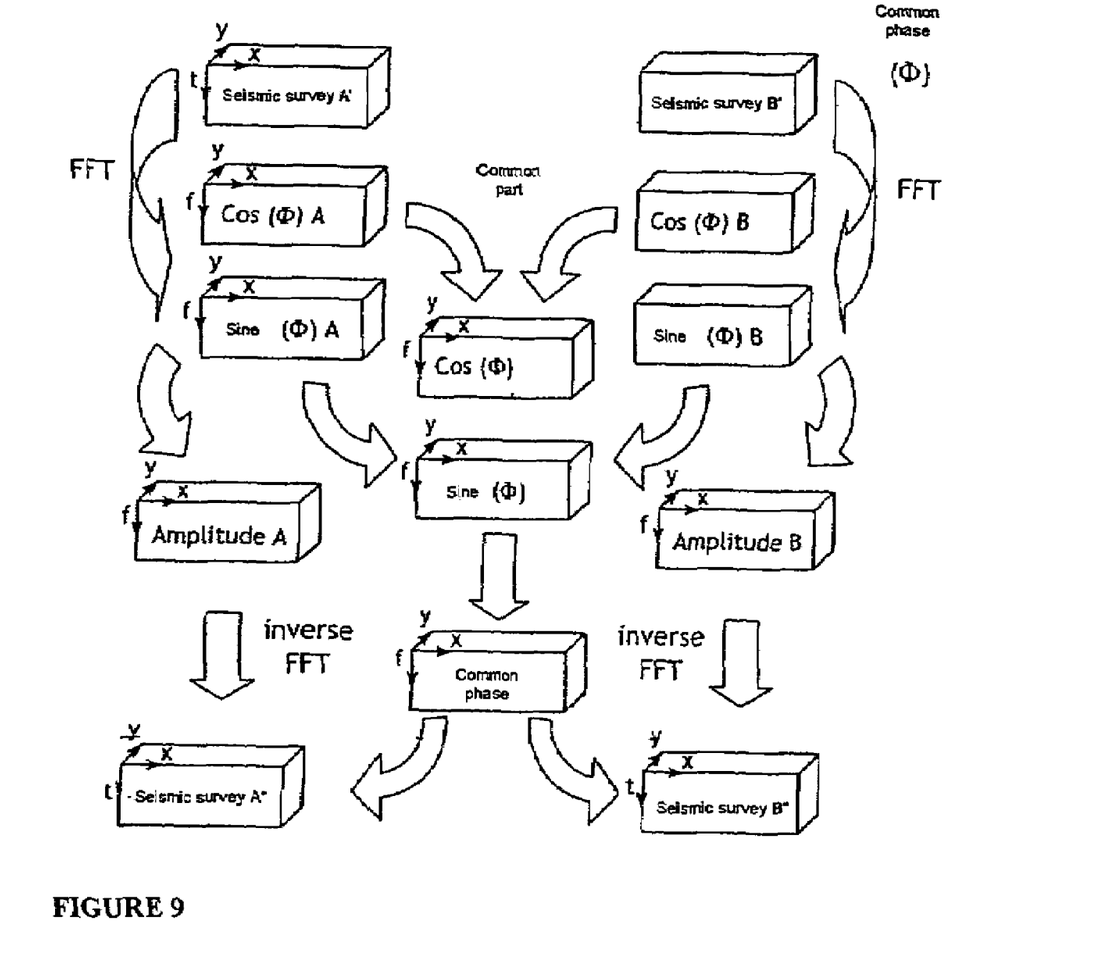
FIG. 9 illustrates another mode of possible implementation for calculating two cubes with a common phase.

Yet another possible variant implementation is illustrated in FIG. 9.

In this variant implementation, amplitude cubes associated respectively with cube A and with cube B are extracted.

In parallel or in a second step, the real and imaginary parts of the cubes A and B yield cubes corresponding to the cosine and to the sine of the phase of the data.

Cubes corresponding the one to the common part of the cosine cubes, the other to the common part of the sine cubes are then determined.

Next, a cube is determined whose data are the ratio of the data of the sine cube and of the cosine cube thus obtained: this produces a cube giving the common part of the phase.

This common phase cube is combined with the two amplitude cubes initially extracted from the cubes A and B so as to deduce therefrom filtered cubes A' and B'.

These two filtered data cubes may themselves form the subject of the second iteration described with reference to FIG. 5.

As a further variant, it is possible to calculate the cube common to the data cubes A and B by combining on the one hand the cube of common phase part and on the other hand the cube of common amplitude part.

It will be noted that in the examples above, the common part of each frequency plane has been calculated by a geostatic method called automatic factorial co-kriging (or automatic multi-variable kriging analysis).

Processings Other than 2D Factorial Co-kriging

Other processing procedures for estimating the common part, and in particular processing procedures implementing factorial co-kriging are conceivable.

It is in particular possible to determine a common part directly in the time domain over a succession of seismic amplitude (or other data) maps (x, y).

For each instant considered, the part common to the two mappings which correspond at this instant is then determined by implementing factorial automatic co-kriging processing.

Likewise, the processing can use 3D operators instead of 2D operators. The factorial automatic co-kriging processing in fact generalizes with a three-dimensional covariance matrix.

It should be noted that the use of 2D (x, y) operators (or 3D as the case may be) renders the method highly effective for filtering spatially organized noise.

Of course, likewise, it is possible to determine parts common to more than two cubes, by calculating for example common parts of common parts. In this way, the method proposed may be extended to a number of cubes greater than two.

Annex 1—Reminder on Factorial Co-kriging

Described below is an example of obtaining a common mapping by factorial co-kriging. The two functions corresponding to these two mappings are denoted Z1 and Z2.

Firstly, the cross-variogram of these two functions is calculated, the values of which are:

$$\gamma_{12}(h) = \frac{1}{N} \sum (Z1(x) - Z1(x+h))(Z2(x) - Z2(x+h))$$

where x and x+h denote the pairs of points taken into consideration along the direction and for the distance h for which the value of the variogram is determined, and where N is the number of these pairs of points for this direction and this distance.

Knowing this cross-variogram, an estimate of the function corresponding thereto is then determined, this function satisfying:

$$Z^*_{12}(x) = \Sigma \lambda_\alpha^1 Z_\alpha^1 + \Sigma \lambda_\beta^2 Z_\beta^2$$

where $\alpha$ and $\beta$ are two dummy indices denoting the points considered around the point x for which we seek to determine an estimate of the said function, $Z_\alpha^1$ and $Z_\beta^2$ being the value at the said point x, N being the number of these points and where $\lambda_\alpha^1$ and $\lambda_\beta^2$ are weighting coefficients.

These weighting coefficients $\lambda_\alpha^1$ and $\lambda_\beta^2$ are determined by inverting the co-kriging equation:

$$\begin{bmatrix} C_{11}11 & \ldots & C_{11}N1 & C_{12}11 & \ldots & C_{12}11 \\ \ldots & \ldots & \ldots & \ldots & \ldots & \ldots \\ C_{11}1N & \ldots & C_{11}NN & C_{12}11 & \ldots & C_{12}NN \\ C_{21}11 & \ldots & C_{21}N1 & C_{22}11 & \ldots & C_{22}N1 \\ \ldots & \ldots & \ldots & \ldots & \ldots & \ldots \\ C_{21}1N & \ldots & C_{21}NN & C_{22}11 & \ldots & C_{22}NN \end{bmatrix} \begin{bmatrix} \lambda_{11} \\ \ldots \\ \lambda_{1N} \\ \lambda_{21} \\ \ldots \\ \lambda_{2N} \end{bmatrix} = \begin{bmatrix} C_{12}1X \\ \ldots \\ C_{12}NX \\ C_{12}1X \\ \ldots \\ C_{12}NX \end{bmatrix}$$

where the coefficients C12αβ and C21αβ are the cross-variance values of the functions Z1 and Z2 at the points corresponding to the indices α and β where the coefficients C11αβ and C22αβ are the covariance values respectively of the function Z1 and of the function Z2 at the said points. The index X corresponds to the point denoted by x previously.

It will be noted that the matrix which appears in this equation has the advantage of being invertible under certain calculation conditions.

In this way, by using the experimental covariances, the two variables corresponding to the two series of initial data are automatically decomposed into a common component and two orthogonal residual components. The regularity of the data implies that the experimental covariance is known for all the distances used. No interpolation is necessary and the matrix is positive definite.

The function thus obtained is an estimate of the component common to the two series of data that the two mappings constitute.

The invention claimed is:

1. Method of processing a collection of seismic cubes, each seismic cube corresponding to a gather of seismic traces in which each seismic trace is a time-dependent amplitude signal and is associated with a given position on the ground zone over which the acquisition has been carried out, the various seismic cubes corresponding to one and the same acquisition zone and to various moments of acquisition, characterized in that at least one seismic cube which is an estimate of the component common to at least two seismic cubes corresponding to different moments of acquisition is determined, said estimate of component common to at least two seismic cubes being defined as the coherent or invariant part of the seismic cubes, and this estimate of common component is subtracted from at least one of the two initial cubes.

2. Method according to claim 1, characterized in that a filtering processing is implemented on a differential cube thus obtained.

3. Method according to claim 1, characterized in that the cube which corresponds to the estimate of the common component of both of the two initial cubes is subtracted from them, in that a filtering processing is implemented on both of the two differential cubes thus obtained and in that these filtered differential cubes are subtracted or summed to reconstitute an estimate of the difference between the two initial cubes.

4. Method according to claim 1, characterized in that, to determine a cube which is an estimate of a component common to at least two seismic cubes:
   each of these two seismic cubes is converted into the frequency domain to obtain for each of them a real cube and an imaginary cube,
   a seismic cube which is an estimate of the component common to the real cubes thus obtained and a cube which is an estimate of the component common to the two imaginary cubes thus obtained are calculated, and
   the two cubes, the one real, the other imaginary, thus obtained are converted into the time domain.

5. Method according to claim 1, characterized in that, to determine a cube which is an estimate of a component common to at least two cubes:
   each of these cubes is converted into the frequency domain so as to deduce therefrom for each of them an amplitude cube and a phase cube,
   an estimate of the part common to the amplitude cubes thus obtained is calculated.

6. Method according to claim 5, characterized in that:
   the amplitude cube thus obtained is converted into the time domain while associating it respectively with the various phase cubes,
   each of the cubes thus obtained in the time domain is converted into the frequency domain so as to obtain for each of these cubes a real cube and an imaginary cube,
   a cube which is an estimate of the component common to the real cubes and a cube which is an estimate of the component common to the imaginary cubes are calculated, and the two cubes, the one real, the other imaginary, thus obtained are converted into the time domain.

7. Method according to claim 1, characterized in that, to determine a cube which is an estimate of a component common to at least two-cubes:
   each of these cubes is converted into the frequency domain so as to deduce therefrom for each of them an amplitude cube, as well as a cube corresponding to its real part and a cube corresponding to its imaginary part,
   cosines cubes and sine cubes are extracted from the cubes corresponding to the real part and from the cubes corresponding to the imaginary part,
   an estimate of the part common to the cosine cubes and an estimate of the sine cubes are calculated,
   a common-phase-data cube is deduced from the thus calculated cubes of common parts.

8. Method according to claim 7, characterized in that:
   each of the cubes thus obtained in the time domain is converted into the frequency domain to obtain for each of these cubes a real cube and an imaginary cube,
   a cube which is an estimate of the component common to the real cubes and a cube which is an estimate of the component common to the imaginary cubes are calculated, and
   the two cubes, the one real, the other imaginary, thus obtained are converted into the time domain.

9. Method according to claim 4, characterized in that, to calculate a cube which is an estimate of a component common to at least two seismic cubes, a factorial co-kriging processing is implemented.

10. Method according to claim 9, characterized in that, to calculate a cube which is an estimate of a component common to at least two seismic cubes:
   each of these seismic cubes is sampled so as to deduce therefrom for each of them a succession of 2D mappings,
   covariance and cross-variance matrices, corresponding to the variograms of both of these two mappings, as well as to their cross-variogram, are determined for each 2D mapping pair thus obtained,
   a factorial co-kriging system which corresponds to these matrices is solved so as to deduce therefrom a spatial operator to be applied to the two 2D mappings which correspond thereto, so as to deduce therefrom a 2D mapping which corresponds to their common component, the collection of 2D mappings thus obtained making it possible to reconstitute the common seismic cube.

11. Method according to claim 10, characterized in that, to determine the co-kriging system to be solved so as to deduce the spatial operator to be applied to two 2D mappings, a mask intended to cancel the data of the said mapping over a certain zone is applied to the data of at least one of the two mappings, prior to the determination of the covariances and of the cross-variances.

12. Method for revealing alterations in geological or geophysical characteristics over hydrocarbon reservoirs, in which seismic acquisitions are implemented at several different moments and seismic cubes corresponding to these acquisitions are processed so as to reveal any alterations, characterized in that said method comprises processing a collection of seismic cubes, each seismic cube corresponding to a gather of seismic traces in which each seismic trace is a time-dependent amplitude signal and is associated with a given position on the ground zone over which the acquisition has been carried out, the various seismic cubes corresponding to one and the same acquisition zone and to various moments of acquisition, characterized in that at least one seismic cube which is an estimate of the component common to at least two seismic cubes corresponding to different moments of acquisition is determined, said estimate of component common to at least two seismic cubes being defined as the coherent or invariant part of the seismic cubes, and this estimate of common component is subtracted from at least one of the two initial cubes.

13. Method according to claim 12, characterized in that a filtering processing is implemented on a differential cube thus obtained.

14. Method according to claim 12, characterized in that the cube which corresponds to the estimate of the common component of both of the two initial cubes is subtracted from them, in that a filtering processing is implemented on both of the two differential cubes thus obtained and in that these filtered differential cubes are subtracted or summed to reconstitute an estimate of the difference between the two initial cubes.

15. Method according to claim 12, characterized in that, to determine a cube which is an estimate of a component common to at least two seismic cubes:
each of these two seismic cubes is converted into the frequency domain to obtain for each of them a real cube and an imaginary cube,
a seismic cube which is an estimate of the component common to the real cubes thus obtained and a cube which is an estimate of the component common to the two imaginary cubes thus obtained are calculated, and
the two cubes, the one real, the other imaginary, thus obtained are converted into the time domain.

16. Method according to claim 12, characterized in that, to determine a cube which is an estimate of a component common to at least two cubes, each of these cubes is converted into the frequency domain so as to deduce therefrom for each of them an amplitude cube and a phase cube, an estimate of the part common to the amplitude cubes thus obtained is calculated.

17. Method according to claim 16, characterized in that:
the amplitude cube thus obtained is converted into the time domain while associating it respectively with the various phase cubes,
each of the cubes thus obtained in the time domain is converted into the frequency domain so as to obtain for each of these cubes a real cube and an imaginary cube,
a cube which is an estimate of the component common to the real cubes and a cube which is an estimate of the component common to the imaginary cubes are calculated, and
the two cubes, the one real, the other imaginary, thus obtained are converted into the time domain.

18. Method according to claim 12, characterized in that, to determine a cube which is an estimate of a component common to at least two cubes:
each of these cubes is converted into the frequency domain so as to deduce therefrom for each of them an amplitude cube, as well as a cube corresponding to the real part and from the cubes corresponding to the imaginary part,
cosines cubes and sine cubes are extracted from the cubes corresponding to the real part and from the cubes corresponding to the imaginary part,
an estimate of the part common to the cosine cubes and an estimate of the sine cubes are calculated, and
a common-phase-data cube is deduced from the thus calculated cubes of common parts.

19. Method according to claim 18, characterized in that:
each of the cubes thus obtained in the time domain is converted into the frequency domain to obtain for each of these cubes a real cube and an imaginary cube,
a cube which is an estimate of the component common to the real cubes and a cube which is an estimate of the component common to the imaginary cubes are calculated, and
the two cubes, the one real, the other imaginary, thus obtained are converted into the time domain.

20. Method according to claim 15, characterized in that, to calculate a cube which is an estimate of a component common to at least two seismic cubes, a factorial co-kriging processing is implemented.

21. Method according to claim 20, characterized in that, to calculate a cube which is an estimate of a component common to at least two seismic cubes:
each of these seismic cubes is sampled so as to deduce therefrom for each of them a succession of 2D mappings,
covariance and cross-variance matrices, corresponding to the variograms of both of these two mappings, as well as to their cross-variogram, are determined for each 2D mapping pair thus obtained,
a factorial co-kriging system which corresponds to these matrices is solved so as to deduce therefrom a spatial operator to be applied to the two 2D mappings which correspond thereto, so as to deduce therefrom a 2D mapping which corresponds to their common component, the collection of 2D mappings thus obtained making it possible to reconstitute the common seismic cube.

22. Method according to claim 21, characterized in that, to determine the co-kriging system to be solved so as to deduce the spatial operator to be applied to two 2D mappings, a mask intended to cancel the data of the said mapping over a certain zone is applied to the data of at least one of the two mappings, prior to the determination of the covariances and of the cross-variances.

* * * * *

UNITED STATES PATENT AND TRADEMARK OFFICE
CERTIFICATE OF CORRECTION

PATENT NO. : 7,337,070 B2  
APPLICATION NO. : 10/554849  
DATED : February 26, 2008  
INVENTOR(S) : Didier Lecerf Page 1 of 1

It is certified that error appears in the above-identified patent and that said Letters Patent is hereby corrected as shown below:

Title page, item (54), and col. 1, the title "Method for Treating Seismic Cubes Corresponding to Obtained for Common Zone at Different Times" should read --Method for Treating Seismic Cubes Corresponding to Acquisitions Obtained for a Common Zone at Different Times--

Signed and Sealed this

Twenty-ninth Day of July, 2008

JON W. DUDAS  
*Director of the United States Patent and Trademark Office*